United States Patent
Brödner et al.

(10) Patent No.: US 12,009,725 B2
(45) Date of Patent: Jun. 11, 2024

(54) DRIVE HAVING AN ELECTRIC MOTOR, A CONVERTER, AND AN INTERMEDIATE PART ARRANGED BETWEEN THE ELECTRIC MOTOR AND THE CONVERTER

(71) Applicant: SEW-EURODRIVE GMBH & CO. KG, Bruchsal (DE)

(72) Inventors: Johannes Brödner, Ubstadt-Weiher (DE); Tobias Stark, Bad Schönborn (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 299 days.

(21) Appl. No.: 17/628,095

(22) PCT Filed: Jun. 23, 2020

(86) PCT No.: PCT/EP2020/025297
§ 371 (c)(1),
(2) Date: Jan. 18, 2022

(87) PCT Pub. No.: WO2021/008723
PCT Pub. Date: Jan. 21, 2021

(65) Prior Publication Data
US 2022/0263380 A1 Aug. 18, 2022

(30) Foreign Application Priority Data
Jul. 18, 2019 (DE) .................... 10 2019 004 982.9

(51) Int. Cl.
*H02K 5/22* (2006.01)
*H02K 5/02* (2006.01)
(Continued)

(52) U.S. Cl.
CPC ............... *H02K 5/225* (2013.01); *H02K 5/02* (2013.01); *H02K 5/18* (2013.01); *H02K 5/22* (2013.01); *H02K 11/33* (2016.01)

(58) Field of Classification Search
CPC .......... H02K 5/18; H02K 5/225; H02K 11/33; H02K 11/28; H02K 5/00; H02K 5/02;
(Continued)

(56) References Cited

U.S. PATENT DOCUMENTS 8,324,770 B2    12/2012 Gupta et al.
10,243,425 B2 *  3/2019 Mikkelsen .......... F04D 29/5806
(Continued)

FOREIGN PATENT DOCUMENTS

CN    102447354 A    5/2012
CN    104170220 A    11/2014
(Continued)

OTHER PUBLICATIONS

Antunes et al., Heat Sink for Rotating Electric Machine, Jan. 21, 2021, WO 2021007628 (English Machine Translation) (Year: 2021).*
(Continued)

*Primary Examiner* — Alexander A Singh
(74) *Attorney, Agent, or Firm* — Carter, DeLuca & Farrell LLP

(57) ABSTRACT

A drive includes an electric motor, a converter, and an intermediate part arranged between the electric motor and the converter. A bottom part is connected to the intermediate part in a thermally conductive manner, a top part set apart from the intermediate part is connected to the bottom part in a thermally conductive manner, and the top part has cooling fins.

23 Claims, 4 Drawing Sheets

(51) Int. Cl.
*H02K 5/18* (2006.01)
*H02K 11/33* (2016.01)

(58) Field of Classification Search
CPC .. H02K 5/04; H02K 5/06; H02K 5/08; H02K 5/15; H02K 5/22; H02K 5/24
USPC .................................................. 310/89, 68 R
See application file for complete search history.

(56) References Cited

U.S. PATENT DOCUMENTS

| | | | | |
|---|---|---|---|---|
| 2008/0084141 | A1* | 4/2008 | Schueren | H02K 5/225 |
| | | | | 310/68 B |
| 2009/0021091 | A1 | 1/2009 | Shiino | |
| 2015/0069885 | A1* | 3/2015 | Fleming | H02K 5/04 |
| | | | | 310/91 |

FOREIGN PATENT DOCUMENTS

| | | |
|---|---|---|
| DE | 9415933 U1 | 11/1994 |
| DE | 10361748 A1 | 7/2005 |
| DE | 102005037488 A1 | 3/2006 |
| DE | 102005032969 A1 | 2/2007 |
| DE | 102007034913 A1 | 2/2009 |
| DE | 102010047762 A1 | 4/2012 |
| DE | 102013205897 A1 | 10/2014 |
| DE | 102017220970 A1 | 5/2019 |
| EP | 0661793 A1 | 7/1995 |
| EP | 2607707 A1 | 6/2013 |
| WO | WO-2021007628 A1 * | 1/2021 ............... H02K 5/04 |

OTHER PUBLICATIONS

International Report on Patentability issued in corresponding International Application No. PCT/EP2020/025297 dated Jan. 18, 2022, pp. 1-8, English Translation.

International Search Report issued in corresponding International Application No. PCT/EP2020/025297 dated Sep. 28, 2020, pp. 1-2, English Translation.

\* cited by examiner

DRIVE HAVING AN ELECTRIC MOTOR, A CONVERTER, AND AN INTERMEDIATE PART ARRANGED BETWEEN THE ELECTRIC MOTOR AND THE CONVERTER

FIELD OF THE INVENTION

The present invention relates to a drive having an electric motor, a converter, and an intermediate part arranged between the electric motor and the converter.

BACKGROUND INFORMATION

In certain conventional systems, an electric motor fed by a converter can be controlled based on the rotational speed.

German Patent Document No. 94 15 933 describes a pump unit fed by a frequency converter.

German Patent Document No. 10 2017 220 970 describes an electric motor with a mounted converter.

German Patent Document No. 10 2013 205 897 describes a converter motor.

European Patent Document No. 2 607 707 describes a canned motor of a pump unit.

German Patent Document No. 103 61 748 describes a compact drive.

German Patent Document No. 10 2005 032 969 describes a converter motor.

German Patent Document No. 10 2007 034 913 describes a converter motor having a fan cover.

SUMMARY

Example embodiments of the present invention provide a drive in a more efficient manner.

According to an example embodiment of the present invention, a drive has an electric motor, a converter, and an intermediate part arranged between the electric motor and the converter. A bottom part is connected to the intermediate part in a thermally conductive manner, a top part set apart from the intermediate part is connected to the bottom part in a thermally conductive manner, and the top part has cooling fins. This offers the advantage that the heat is able to be channeled out of the intermediate part to the top part, which has cooling fins so that the heat can be dissipated into the environment.

According to example embodiments, the electric motor is set apart from the converter, and the intermediate part is connected both to the electric motor, e.g., to the stator housing of the electric motor, and to the converter, e.g., to the housing of the converter. This has the advantage that connection elements may be positioned in the intermediate part, e.g., a terminal board on which the stator lines of the stator of the electric motors are placed and connected to contacts of a plug connector part whose corresponding mating plug connector part is situated on the converter, so that the converter feeds the electric motor. The supply lines of the converter, on the other hand, are able to be routed to contacts of the mating plug connector part, and the lines of a cable are connected to contacts of the plug connector part which are connected to lines of a cable guided through one of the screw parts. The cable can thus be routed to a disconnecting switch which is situated in the bottom part and makes it possible to sever the electric supply to the AC voltage supply network, e.g., a three-phase power system.

According to example embodiments, the intermediate part has uninterrupted threaded bores, which, for example, pass through a wall of the intermediate part and into which screw parts are screwed, which press the bottom part toward the intermediate part, e.g., by their broadened regions, e.g., the threaded bores being covered by the bottom part together with the top part. This offers the advantage that a force-locked connection between the bottom part and the intermediate part can be induced on the one hand, and a cable is able to be fed through the screw part on the other hand.

According to example embodiments, a bead is provided on the bottom part, which, for example, touches the intermediate part and/or surrounds the outlet openings of the threaded bores directed toward the bottom part. This has the advantage that a seal, which is elastically deflectable until the bead rests against the intermediate part, can readily be placed between the intermediate part and the bottom part. A tight connection can thus be brought about, and the threaded bores are able to be protected.

According to example embodiments, the bottom part is set apart from the converter, the bottom part is set apart from the electric motor, the top part is set apart from the converter, and the top part is set apart from the electric motor. This offers the advantage that the heat is able to be channeled out of the intermediate part to the top part via the bottom part. The further heat sources, which are set apart, i.e., the electric motor and converter, do not interfere with this process.

According to example embodiments, a seal, e.g., a flat seal, is situated between the intermediate part and the bottom part, the seal being positioned radially outside the bead in relation to the bore axis of one of the threaded bores, and/or being arranged circumferentially around the bead, and the elastic deformation of the seal, for example, is limited with the aid of the bead resting against the intermediate part. This has the advantage that the bead allows for a defined deflection of the seal.

According to example embodiments, the respective screw part, e.g., each screw part, has an uninterrupted hole that passes centrally through the respective screw part, e.g., in the direction of the bore axis of the threaded bore, for the feedthrough of a cable from the interior space of the bottom part to the interior space surrounded by the intermediate part. This offers the advantage that a supply cable can be fed through a respective screw part.

According to example embodiments, the respective screw part projects through a recess in each case, e.g., through a recess that passes through a wall of the bottom part, the recess including two circular overlapping holes, e.g., so that in a first installation position of the bottom part on the intermediate part, the screw part projects through a first one of the two overlapping holes, and in the other installation position, it projects through the other hole. This has the advantage that the recess has a symmetrical configuration such that an installation of the bottom part on an opposite wall of the intermediate part is possible, the bottom part being rotated 180° in the process.

According to example embodiments, the wall of the intermediate part has uninterrupted threaded bores not only on the side facing the bottom part but also on the opposite side, or in other words, especially in mirror symmetry with the plane that includes the axis of rotation of the rotor, which is aligned parallel to the plane including the flat contact region between the bead and the intermediate part, or which is perpendicular to a plane that is perpendicular to the plane including the flat contact region between the bead and the intermediate part and perpendicular to the plane including the flat contact region between the top part and the bottom part, or which is perpendicular to a plane that is perpendicular to the plane including the flat contact region between the bead and the intermediate part and perpendicular to the plane including a seal interposed between the bottom part and the top part, e.g., such that the bottom part is connectable to the bottom part not only in a first installation position but also on the opposite side in a second installation position. This has the advantage that the bottom part is installable at two installation positions. As a result, twice the number of variants is able to be produced by the same number of parts.

According to example embodiments, a brake resistor is accommodated in the intermediate part and connected to the intermediate part in a thermally conductive manner. This offers the advantage that the brake resistor may be protectively placed in an interior of the brake resistor and the heat can be conducted to the top part via the intermediate part and the bottom part.

According to example embodiments, the brake resistor is situated on the inner side of the particular region of the wall of the intermediate part and connected in a thermally conductive manner to the intermediate part against whose outer side the bead is resting, e.g., for the thermally conductive connection of the bottom part to the intermediate part. This offers the advantage that the heat of the brake resistor is able to be dissipated directly into the bottom part.

According to example embodiments, the threaded bores accommodating the screw parts are situated inside the region. This has the advantage that the heat conduction may take place not only via the bead but also via the screw part.

According to example embodiments, the screw parts, the intermediate part, the bottom part, and the top part are produced from metal, which means that a first heat conduction path leads from the brake resistor via the intermediate part and the screw parts to the bottom part and then to the top part, and a second heat conduction path leads from the brake resistor via the intermediate part to the bead of the bottom part and then from the bottom part to the top part. This has the advantage of allowing for a better heat conduction.

According to example embodiments, a further seal is situated between the top part and the bottom part, the seal being radially surrounded by a region projecting at the top part, the projecting region resting directly against the bottom part and touching it, and the top part, for example, is connected to the bottom part with the aid of connection screws so that the projecting region of the top part is pressed against the bottom part. This offers the advantage that the bottom part is also situated at the top part with direct contact.

According to example embodiments, the contact region between the bottom part and the top part, e.g., the contact region between the bottom part and the region that projects at the top part, has a flat configuration, and the normal of the plane including the contact region has an angle of between 20° and 70° to the bore axis of the respective threaded bore. This offers the advantage of allowing for a better installation in that the electrical connections are readily established when the top part is removed.

According to example embodiments, the bottom part is produced as a cast part using two die parts that are pulled away from each other in a drawing direction, the drawing direction is aligned parallel to the normal of the plane that includes the contact region, e.g., between the bottom part and the top part, e.g., a first one of the two die parts demolds a first region of the recess that includes two circular overlapping holes, and a second one of the two die parts demolds a second region of the recess that includes two circular overlapping holes. This has the advantage that the die parts are formed such that the edge is aligned parallel to the bore axis of the threaded bores. However, the drawing direction is not parallel to the bore axis and thus also not parallel to the edge.

Further features and aspects of example embodiments of the present invention are described in greater detail below with reference to the appended schematic Figures.

DETAILED DESCRIPTION

Figure 1:
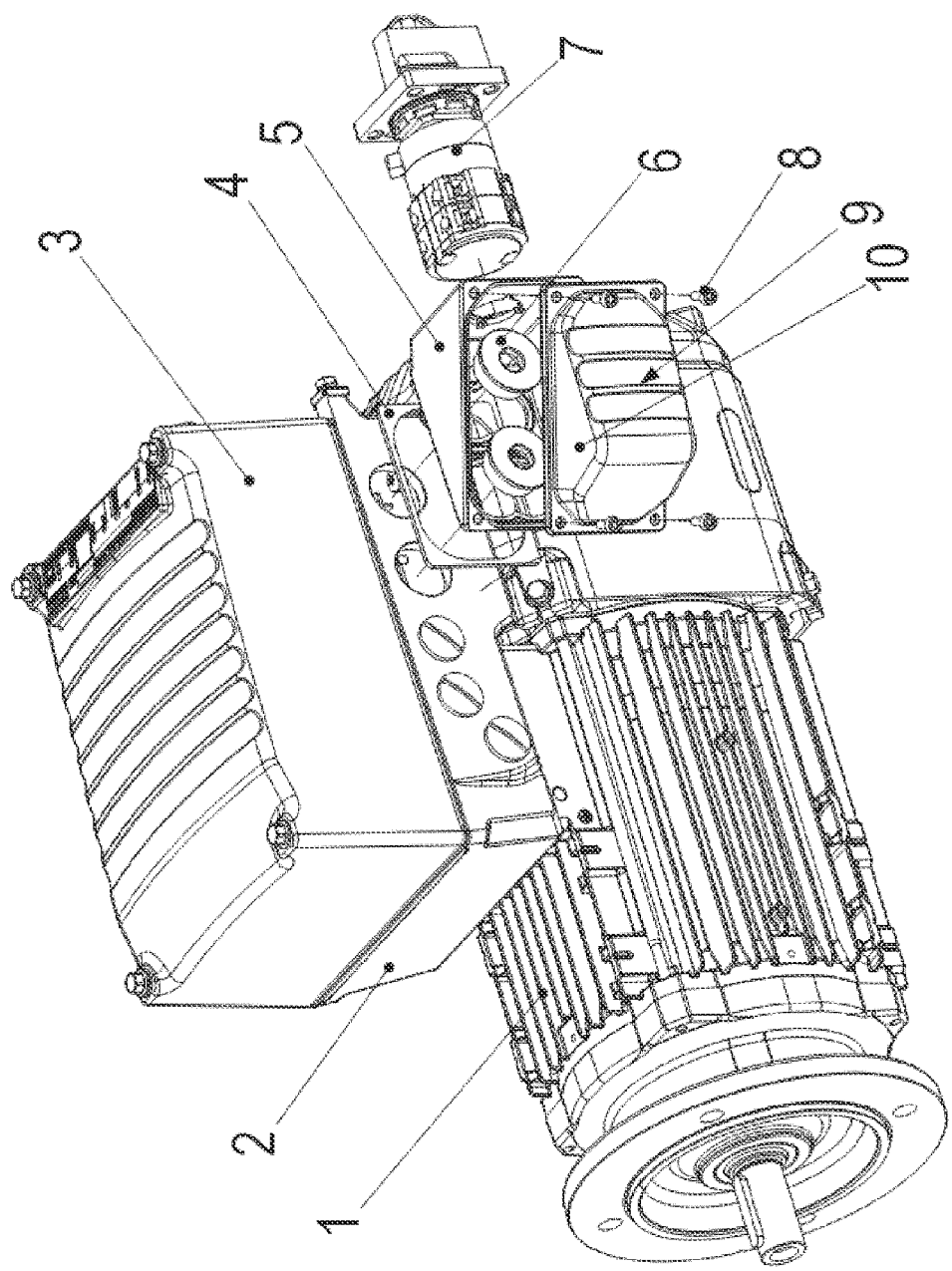
FIG. 1 is an exploded view of a drive according to an example embodiment of the present invention provided with an intermediate part 2, the intermediate part being positioned between a converter 3 and an electric motor 1, and a switch 7, e.g., a disconnection switch, is situated on intermediate part 2.
Figure 2:
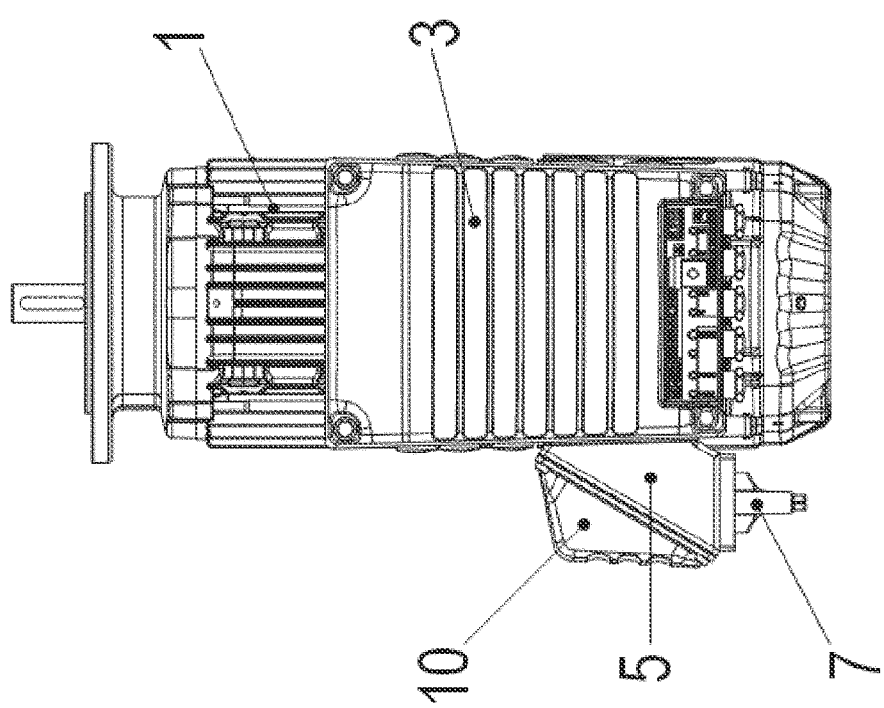
FIG. 2 is a top view of the drive.
Figure 3:
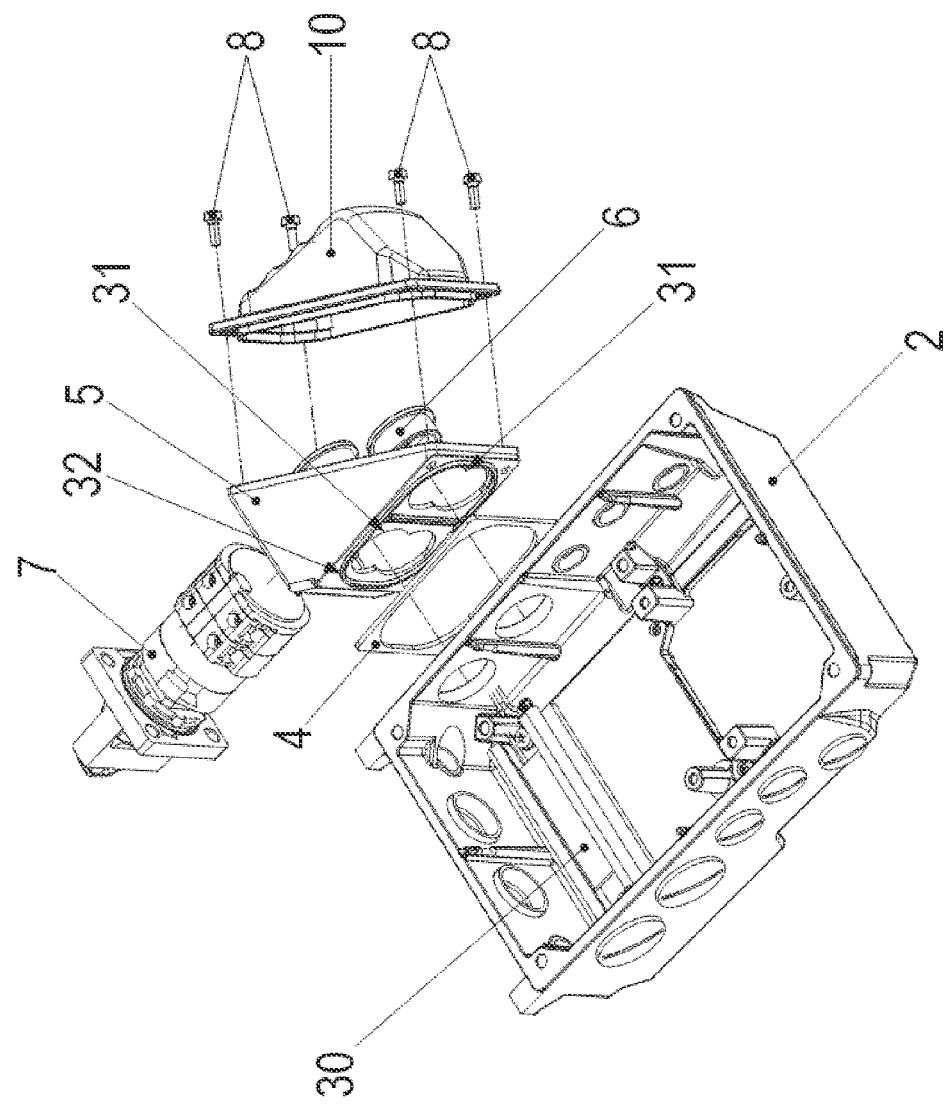
FIG. 3 is an exploded view of frame part 2 with switch 7, which is situated on frame part 2 with the aid of a top part 10 mounted on a bottom part 5.
Figure 4:
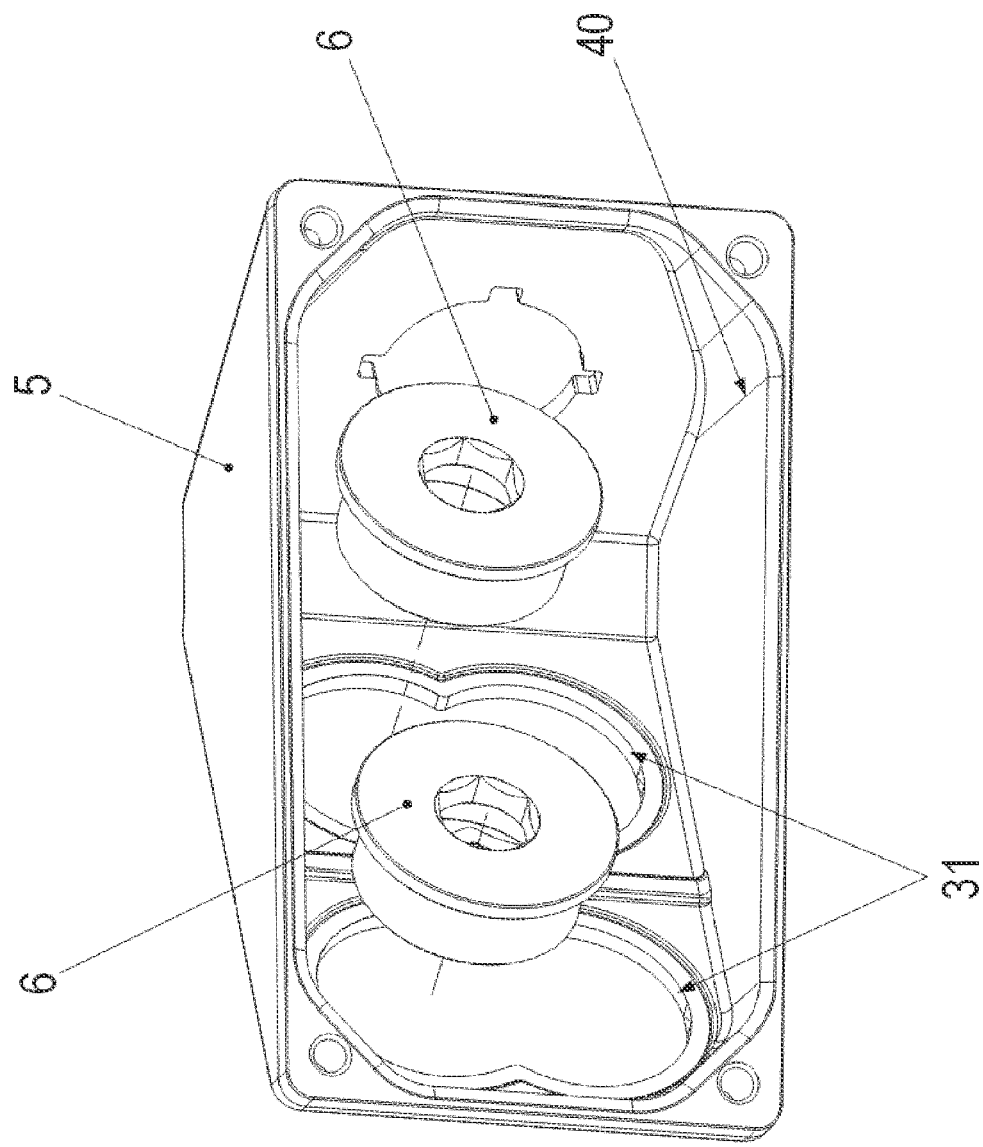
FIG. 4 is a perspective view of bottom part 5 with two associated screw parts 6.

As illustrated in the Figures, the drive has an electric motor 1, which is fed by a converter 3. This converter is supplyable by an electrical AC voltage supply network, e.g., a three-phase power system, and a switch 7 for separating converter 3 from the AC voltage supply network is situated in a bottom part 5.

A top part may be mounted on the bottom part and connected with the aid of screws 8.

Bottom part 5 is clamped to intermediate part 2 in that screw parts 6 are screwed into threaded bores of intermediate part 2, which have an uninterrupted configuration and thus pass and/or extend through the wall of intermediate part 2. Screw parts 6 have widened axial end regions in each case, which exert pressure on the wall of bottom part 5 for the clamping of bottom part 5. On its side facing intermediate part 2, bottom part 5 has a protruding bead 32, which is arranged circumferentially around recesses for screw parts 6 that are formed on bottom part 5 and penetrate the wall of bottom part 5.

A switch 7, which is arranged as a separation switch, i.e., for separating the network supply of converter 3 from the converter, projects through a further recess of the bottom part. Situated between bottom part 5 and intermediate part 2 is a seal, e.g., a flat seal, which is elastically deformed when pressure is exerted on bottom part 5 with the aid of screw parts 6. Bead 32 rests directly against intermediate part 2 so that the elastic deformation is thereby limited with the aid of bead 32.

Seal 4 is situated radially outside bead 32, and when screw parts 6 exert pressure on bottom part 5, seal 4 is deformed only until bead 32 rests directly against intermediate part 2.

A top part 9, which has cooling fins 9, e.g., on its side facing away from bottom part 5, is mounted on bottom part 5. Top part 10 is connected to bottom part 5 with the aid of screws 8.

A seal is also disposed between top part 9 and bottom part 5, which is again elastically deformed until a region protruding from top part 9 rests against bottom part 5. Here, too, a deformation of the seal is limited.

The two screw parts 6 have a recess that passes centrically through them and through which a cable is guided in each case.

Intermediate part 2, bottom part 5 and top part 10 are made of metal, e.g., aluminum.

As a result, these parts are connected to one another in a manner that provides excellent heat conduction.

Converter 3 has a lid, which is provided with cooling fins and thus cools the power electronics of converter 3. Electric motor 1 has a stator housing which also has cooling fins for heating the stator windings of the electric motor.

A brake resistor 30 is situated in intermediate part 2 for converting excess energy generated in a generator-mode operation of electric motor 1 into thermal energy.

This brake resistor 30 is situated in intermediate part 2 and connected in a thermally conductive manner to a region of intermediate part 2. Thus, the heat generated by brake resistor 30 is substantially dissipated to intermediate part 2. However, intermediate part 2 has no cooling fins and therefore is limited in its ability to dissipate the generated heat into the environment.

However, because the brake resistor is situated on the inner side of the particular region of intermediate part 2 whose outer side bead 32 rests against intermediate part 2, a large portion of the heat flow generated by brake resistor 30 is dissipated to bottom part 5. A portion of the heat flow flows via bottom part 5 to top part 10 where it is dissipated to the environment by its cooling fins 9. The cooling fins enlarge the surface of top part 10. The heat transition resistance from the top part to the ambient air is therefore very low.

As a result, the housing formed by bottom part 5 and top part 10 functions not only as a housing of switch 7, but also as a heat sink for brake resistor 30.

The wall of intermediate part 2 has uninterrupted threaded bores not only on the side facing bottom part 5, but also on the opposite side, i.e., especially in mirror symmetry with the plane that includes the axis of rotation of the rotor and is aligned parallel to the plane that includes the flat contact region between bead 32 and intermediate part 2.

This therefore allows for the installation of bottom part 5 on intermediate part 2 in two alignments that are in mirror symmetry with each other.

Because of the cant arranged on bottom part 5, the bottom part must be installable in the respective other alignment rotated by 180°.

Since screw part 6 is situated within bottom part 5 asymmetrically, e.g., closer to the top side than to the bottom side, the recess of bottom part 5 through which screw part 6 projects is not circular but shaped like the number eight.

Here, the recess thus includes two circular overlapping holes, and in the first installation position of bottom part 5 on intermediate part 2, screw part 6 projects through one hole and in the other installation position, it projects through the other one of the two overlapping holes.

Bottom part 5 is produced as a cast part and die parts are pulled away from one another in a drawing direction during the casting operation. This drawing direction is aligned in the normal direction to the plane accommodating the seal between bottom part 5 and top part 10 and/or the plane accommodating the contact region between bottom part 5 and top part 10.

Because of the plane which is inclined with respect to the flat contact region between intermediate part 2 and bead 32 of bottom part 5 and accommodates the contact region between bottom part 5 and top part 10, bottom part 5 is more readily accessible for servicing purposes.

The wall, i.e., for example, the edge, of the recess that includes the two holes, extends parallel to the bore axes of the threaded bores of intermediate part 2 in all places. For example, the extension of the perpendicular projection of the wall directed onto the bore axis is similar to the extension of the wall in the direction of the bore axis of the threaded bore.

During the die casting process, the wall is produced when the die parts are pulled apart. A first region of the wall is shaped by the first die part and a second region of the wall is formed by the second die part.

The drawing direction is aligned parallel to the normal direction of the plane accommodating the contact region between intermediate part 2 and bead 32. In accordance with the drawing direction, grooves and/or depressions are detectable in the microscopically examined region on the inner wall of bottom part 5.

When the two die parts are pulled apart, the first die part produces the wall, e.g., the edge, of the recess that includes the two holes.

For this purpose, the two die parts have surface regions that are correspondingly inclined with respect to the drawing direction and which immediately lift off from the wall, e.g., the edge, of the recess once the pull-apart movement begins.

Top part 10 is also produced by pulling two die parts apart, the drawing direction again having an angle of between 10° and 80° with respect to the contact area between bottom part 5 and top part 10.

The plane that accommodates the contact area between bead 32 and intermediate part 2 and is inclined relative to the plane that accommodates the contact area between bottom part 5 and top part 10, allows for a simple, interference-free operation of screw parts 6, for instance, after top part 10 has been removed from bottom part 5.

In exemplary embodiments, bottom part 5 is also provided with cooling fins. Even more efficient cooling is therefore possible.

LIST OF REFERENCE NUMERALS 1 electric motor
2 intermediate part
3 converter
4 flat seal
5 bottom part
6 screw part
7 switch, e.g., separation switch
8 screw
9 cooling fins
10 top part
30 brake resistor
31 recess
32 circumferential bead
40 depression, e.g., groove in the drawing direction

The invention claimed is:

1. A drive, comprising:
an electric motor;
a converter; and
an intermediate part arranged between the electric motor and the converter;
wherein a bottom part is connected to the intermediate part in a thermally conductive manner, a top part set apart from the intermediate part is connected to the bottom part in a thermally conductive manner, and the top part having cooling fins; and
wherein the intermediate part includes uninterrupted threaded bores adapted to receive screw parts that press the bottom part toward the intermediate part.

2. The drive according to claim 1, wherein the electric motor is set apart from the converter and the intermediate part is connected to the electric motor and to the converter.

3. The drive according to claim 2, wherein the intermediate part is connected to a stator housing of the electric motor and to a housing of the converter.

4. The drive according to claim 1, wherein the uninterrupted threaded bores pass through a wall of the intermediate part, broadened regions of the screw parts press the bottom part toward the intermediate part, and the uninterrupted threaded bores are covered by the bottom part and with the top part.

5. The drive according to claim 4, wherein at least one of the screw parts includes an uninterrupted hole that passes centrally through the screw part adapted for feedthrough of a cable from an interior space of the bottom part to an interior space surrounded by the intermediate part.

6. The drive according to claim 5, wherein the uninterrupted hole passes centrally through the screw part in a direction of a bore axis of the uninterrupted threaded bore.

7. The drive according to claim 4, wherein each screw part projects through a respective recess of the bottom part, the recess including two circular holes that overlap each other.

8. The drive according to claim 7, wherein the recess passes through a wall of the bottom part, and the recess includes two circular holes that overlap each other so that in a first installation position of the bottom part on the intermediate part, the screw part projects through a first one of the two overlapping holes, and in a second installation position of the bottom part on the intermediate part, the screw part projects through a second one of the two overlapping holes.

9. The drive according to claim 4, wherein the wall of the intermediate part includes uninterrupted threaded bores on a side facing the bottom part and on an opposite side, in mirror symmetry with a plane that includes an axis of rotation of a rotor, which: (a) is aligned parallel to a plane including a flat contact region between a bead arranged on the bottom part the intermediate part; (b) is perpendicular to a plane that is perpendicular to the plane including the flat contact region between the bead and the intermediate part and perpendicular to a plane including a flat contact region between the top part and the bottom part; and/or (c) is perpendicular to a plane that is perpendicular to the plane including the flat contact region between the bead and the intermediate part and perpendicular to the plane including a seal interposed between the bottom part and top part.

10. The drive according to claim 9, wherein the bottom part is connectable to the intermediate part in a first installation position and on the opposite side in a second installation position.

11. The drive according to claim 1, wherein a bead is arranged on the bottom part.

12. The drive according to claim 1, wherein the bottom part is set apart from the converter, the bottom part is set apart from the electric motor, the top part is set apart from the converter, and the top part is set apart from the electric motor.

13. The drive according to claim 1, wherein a contact region between the bottom part and the top part and/or a contact region between the bottom part and a region that projects at the top part has a flat configuration, and a normal of a plane including the contact region has an angle of between 20° to 70° with respect to a bore axis of a respective threaded bore.

14. The drive according to claim 13, wherein the bottom part is arranged as a cast part by two die parts that are pulled away from each other in a drawing direction aligned parallel to the normal of the plane including the contact region.

15. The drive according to claim 14, wherein a first one of the two die parts demolds a first region of a recess that includes two circular overlapping holes, and a second one of the two die parts demolds a second region of the recess that includes the two circular overlapping holes.

16. A drive, comprising:
an electric motor;
a converter; and
an intermediate part arranged between the electric motor and the converter;
wherein a bottom part is connected to the intermediate part in a thermally conductive manner, a top part set apart from the intermediate part is connected to the bottom part in a thermally conductive manner, and the top part having cooling fins;
wherein a bead is arranged on the bottom part; and
wherein the bead touches the intermediate part and/or surrounds outlet openings of threaded bores directed toward the bottom part.

17. A drive, comprising:
an electric motor;
a converter; and
an intermediate part arranged between the electric motor and the converter;
wherein a bottom part is connected to the intermediate part in a thermally conductive manner, a top part set apart from the intermediate part is connected to the bottom part in a thermally conductive manner, and the top part having cooling fins; and
wherein a seal and/or a flat seal is arranged between the intermediate part and the bottom part, the seal being positioned radially outside a bead arranged on the bottom part in relation to a bore axis of at least one uninterrupted threaded bore arranged in the intermediate part adapted to receive screw parts that press the bottom part toward the intermediate part and/or circumferentially around the bead.

18. The drive according to claim 17, wherein an elastic deformation of the seal and/or the flat seal is limited by the bead resting against the intermediate part.

19. The drive according to claim 17, wherein a further seal is arranged between the top part and the bottom part, the seal being radially surrounded by a region projecting at the top part, the projecting region resting directly against and touching the bottom part, the top part being connected to the bottom part with the aid of connection screws so that the projecting region of the top part is pressed against the bottom part.

20. A drive, comprising:
an electric motor;
a converter; and
an intermediate part arranged between the electric motor and the converter;
wherein a bottom part is connected to the intermediate part in a thermally conductive manner, a top part set apart from the intermediate part is connected to the bottom part in a thermally conductive manner, and the top part having cooling fins; and
wherein a brake resistor is accommodated in the intermediate part and connected to the intermediate part in a thermally conductive manner.

21. The drive according to claim 1, wherein the brake resistor is situated on an inner side of a particular region of a wall of the intermediate part and connected in a thermally conductive manner to the intermediate part at whose outer side a bead is located, for a thermally conductive connection of the bottom part to the intermediate part.

22. The drive according to claim 21, wherein threaded bores adapted to accommodate screw parts are arranged inside the region.

23. A drive, comprising:
- an electric motor;
- a converter; and
- an intermediate part arranged between the electric motor and the converter;
- wherein a bottom part is connected to the intermediate part in a thermally conductive manner, a top part set apart from the intermediate part is connected to the bottom part in a thermally conductive manner, and the top part having cooling fins; and
- wherein screw parts, the intermediate part, the bottom part, and the top part are formed of metal, such that a first heat conduction path leads from a brake resistor via the intermediate part and the screw parts to the bottom part and to the top part, and a second heat conduction path leads from the brake resistor via the intermediate part to a bead of the bottom part and then from the bottom part to the top part.

* * * * *